（12） United States Patent
Schmit

(10) Patent No.: US 11,210,443 B2
(45) Date of Patent: Dec. 28, 2021

(54) DISTRIBUTED PROGRAMMABLE DELAY LINES IN A CLOCK TREE

(71) Applicant: Intel Corporation, Santa Clara, CA (US)

(72) Inventor: Herman Henry Schmit, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 827 days.

(21) Appl. No.: 15/841,064

(22) Filed: Dec. 13, 2017

(65) Prior Publication Data

US 2019/0179990 A1 Jun. 13, 2019

(51) Int. Cl.
| | |
|---|---|
| *G06F 30/3312* | (2020.01) |
| *G06F 1/10* | (2006.01) |
| *H03K 19/003* | (2006.01) |
| *H03K 19/096* | (2006.01) |
| *H03K 19/177* | (2020.01) |
| *G06F 30/35* | (2020.01) |
| *G06F 30/327* | (2020.01) |
| *G06F 30/396* | (2020.01) |
| *G06F 119/12* | (2020.01) |

(52) U.S. Cl.
CPC ............ *G06F 30/3312* (2020.01); *G06F 1/10* (2013.01); *G06F 30/327* (2020.01); *G06F 30/35* (2020.01); *H03K 19/00315* (2013.01); *H03K 19/096* (2013.01); *H03K 19/177* (2013.01); *G06F 30/396* (2020.01); *G06F 2119/12* (2020.01)

(58) Field of Classification Search
USPC ........................................................ 716/134
See application file for complete search history.

(56) References Cited

U.S. PATENT DOCUMENTS

| | | | |
|---|---|---|---|
| 7,737,751 B1 * | 6/2010 | Lai ............................ | G06F 1/10 327/292 |
| 9,787,311 B1 * | 10/2017 | Ooi .................... | H03K 19/1737 |
| 2004/0003361 A1 * | 1/2004 | Chaudhari .............. | G06F 30/30 716/113 |
| 2009/0113365 A1 * | 4/2009 | Panigrahi ............ | G06F 30/3312 716/113 |

(Continued)

OTHER PUBLICATIONS

Extended European Search Result for EP Application No. 18206881.7 dated May 13, 2019.

(Continued)

*Primary Examiner* — Mohammed Alam
(74) *Attorney, Agent, or Firm* — Fletcher Yoder, P.C.

(57) ABSTRACT

The present disclosure provides systems and methods for improving operation of integrated circuit device including a logic region, which includes a plurality of logic gates that operate based at least in part on a clock signal to facilitate providing a target function, and a clock tree, which includes a clock switch block that receives a source clock signal from a clock source and a branch communicatively coupled between the clock switch block and the logic region, in which the branch operates to provide the clock signal to the logic region based at least in part on the source clock signal and one or more tunable delay buffers, disposed at junctures of the clock network, that operate to apply a delay to the clock signal based at least in part on a clock skew expected to be introduced by the branch.

10 Claims, 5 Drawing Sheets

(56) References Cited

U.S. PATENT DOCUMENTS

2013/0069703 A1\* 3/2013 Gasper ................ G06F 30/3312
                                                    327/264
2013/0111425 A1\* 5/2013 Kumar .................. G06F 30/327
                                                    716/104
2019/0179990 A1\* 6/2019 Schmit ................ G06F 30/3312

OTHER PUBLICATIONS

Charles Dike, N. K. (2003). A Design for Digital, Dynamic Clock Deskew. VLSI Circuits Conference (pp. 21-24). Kyoto, Japan: IEEE.

\* cited by examiner

DISTRIBUTED PROGRAMMABLE DELAY LINES IN A CLOCK TREE

BACKGROUND

The present disclosure generally relates to integrated circuit devices and, more particularly, to clock trees implemented in an integrated circuit device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, an electronic device or an electrical system may include one or more integrated circuit (IC) devices. To improve operational flexibility, in some instances, an integrated circuit device may be a programmable logic device, such as a field-programmable array (FPGA), that may provide one or more target (e.g., desired) functions based on programming (e.g., configuration) after manufacturing. To facilitate providing a target function, an integrated circuit device may include one or more logic elements (e.g., blocks and/or gates), for example, programmed (e.g., configured) to operate based at least in part on corresponding configuration data.

In some instances, the logic elements in an integrated circuit device may be organized into multiple logic regions, for example, with each logic region providing a target function and/or multiple logic regions cooperating to provide a target function. Thus, in operation, the integrated circuit device may coordinate (e.g., synchronize) operation of multiple logic regions. Since logic elements generally operate based at least in part on a received clock signal, in some instances, the integrated circuit device may coordinate operation of multiple logic regions by supplying the clock signal to corresponding logic elements using a clock tree (e.g., a clock network-on-chip). For example, the clock tree may include multiple branches that each communicate the clock signal through a corresponding logic region.

However, in some instances, a clock signal may become skewed (e.g., time-shifted or phase-shifted) as it is communicated through the clock tree, for example, due to length of the branches and/or stages (e.g., muxes or buffers) along the branches. In fact, likelihood and/or magnitude of clock skew may increase as size/depth of the clock tree increases, variation in length of the branches increases, and/or due to programming of the integrated circuit device. Additionally, the arrival time of the clock signal may be influenced by the temperature and instantaneous voltage of the components of the clock and by the process parameters of individual transistors within that instance of a chip. Since the parameters that influence some amount of the skew are variable across particular instances of a device, across time, or across environmental factors, the skew is unknowable, though it has a range based on the variations of the impacting parameters that is referred to as uncertainty. Since operating based at least in part on the clock signal, clock skew may affect operation of the logic elements and, thus, the integrated circuit device, for example, by decreasing operational efficiency and/or increasing operational latency.

SUMMARY

A summary of certain embodiments disclosed herein is set forth below. It should be understood that these aspects are presented merely to provide the reader with a brief summary of these certain embodiments and that these aspects are not intended to limit the scope of the present disclosure. Indeed, the present disclosure may encompass a variety of aspects that may not be set forth below.

The present disclosure generally relates to integrated circuit (IC) devices, which may operate to perform one or more target (e.g., desired) functions in an electrical system. To facilitate performing a target function, in some embodiments, an integrated circuit device may include one or more logic elements (e.g., blocks or gates) that operate based at least in part on a received clock signal, for example, to perform a logic operation and/or an arithmetic operation used in providing a combinational function, a sequential function, an arithmetic functions, a logic function, and/or a custom function. Thus, in some embodiments, the integrated circuit device may include a clock tree (e.g., a clock network-on-chip) that communicates a clock signal to various logic elements. However, in some instances, the clock signal may become skewed as it is communicated through the clock tree, thereby affecting operation of the logic elements and, thus, the integrated circuit device.

Accordingly, the present disclosure provides techniques to improve operation (e.g., operational efficiency and/or operational latency) of an integrated circuit device by reducing likelihood of clock skew affecting operation. In some embodiments, an integrated circuit device includes a logic region, which includes a plurality of logic gates that operate based at least in part on a clock signal to facilitate providing a target function, and a clock tree, which includes a clock switch block that receives a source clock signal from a clock source and a branch communicatively coupled between the clock switch block and the logic region, in which the branch operates to provide the clock signal to the logic region based at least in part on the source clock signal and the branch includes a tunable delay buffer that operates to apply a delay to the clock signal based at least in part on a clock skew expected to be introduced by the branch.

Furthermore, in some embodiments, a tangible, non-transitory, computer-readable medium stores instructions executable by one or more processors in an electrical system, in which the instructions comprise instruction to determine, using the one or more processors, skew data indicative of difference between a first delay introduced on a source clock signal resulting from routing the source clock signal to a first portion of an integrated circuit device via a clock tree; and instruct, using the one or more processors, one or more tunable delay buffers to adjust delay applied to the source clock signal by the clock tree based at least in part on the skew data.

Moreover, in some embodiments, at each juncture, or node, of the clock network, a tunable (e.g., programmable) delay buffer may be present to allow for adjustment of the clock signal through the entire subtree. Additionally, in some embodiments, clock switch blocks may also be present at each node. In such embodiments, relative measurements of delay between a node's branches may be taken by delay measurement circuits, and the one or more processors may be used to determine a set of adjustments for each clock node to mitigate skew. In these embodiments, the clock adjustment may correspond proportionally to the depth of the clock tree. In other words, a hierarchical set of clock adjustments may be used according to the structure of the clock network to account for clock skew.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Generally, an integrated circuit device operates to provide one or more target functions in an electronic data processing system. For example, the target functions may include combinational functions, sequential functions, arithmetic functions, logic functions, and/or custom function. Thus, in some embodiments, an integrated circuit device may operate to process data, analyze data, store data, and/or read data.

Figure 1:
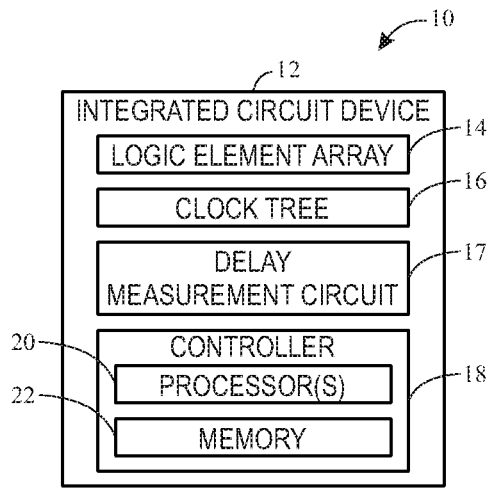
FIG. 1 is a block diagram of an integrated circuit device using the clock alignment techniques described herein, in accordance with an embodiment.

To help illustrate, one embodiment of an electronic data processing system 10 including an integrated circuit device 12 is shown in FIG. 1. In some embodiments, the electronic data processing system 10 may be included in an industrial system, a manufacturing system, an automation system, or the like, such as a factory or plant. Additionally, in some embodiments, the electronic data processing system 10 may be included in an electronic device, such as a handheld computing device, a tablet computing device, a notebook computer, a desktop computer, or the like. Furthermore, in some embodiments, electronic data processing system 10 may be included in an automotive system, such as an airplane, boat, or car.

Thus, although one integrated circuit device 12 is depicted, it should be appreciated that this is merely intended to be illustrative and not limiting. In other words, in other embodiments, the electronic data processing system 10 may include multiple integrated circuit devices 12. For example, the electronic data processing system 10 may include a first integrated circuit 12 (e.g., central processing unit or graphics processing unit) communicatively coupled with a second integrated circuit 12 (e.g., random-access memory).

In any case, as depicted, the integrated circuit device 12 includes a logic element array 14, a clock tree 16, a delay measurement circuit 17, and a controller 18. In some embodiments, the controller 18 may control operation of the logic element array 14 and/or the clock tree 16. To facilitate controlling operation, the controller 18 may include a controller processor 20 and controller memory 22. In some embodiments, the controller 18 may control operation based at least in part on circuit connections (e.g., logic gates) formed in the controller 18.

Additionally or alternatively, the controller processor 20 may execute instructions stored in the controller memory 22. Thus, in some embodiments, the controller processor 20 may include one or more general purpose microprocessors, one or more application specific processors (ASICs), one or more field programmable logic arrays (FPGAs), and/or the like. Additionally, in some embodiments, the controller memory 22 may include one or more tangible, non-transitory, computer-readable mediums. For example, the controller memory 22 may include random access memory (RAM), read only memory (ROM), rewritable non-volatile memory, such as flash memory and/or the like.

As described above, the integrated circuit device 12 may operate to perform one or more target functions in the electronic data processing system 10. To facilitate providing a target function, the logic element array 14 may include communicatively coupled logic elements (e.g., blocks or gates) that operate to perform combinational functions, sequential functions, arithmetic functions, logic functions, and/or custom functions. Additionally, in some embodiments, the logic element array 14 may be divided into one or more logic regions, which each includes one or more logic elements.

Figure 2:
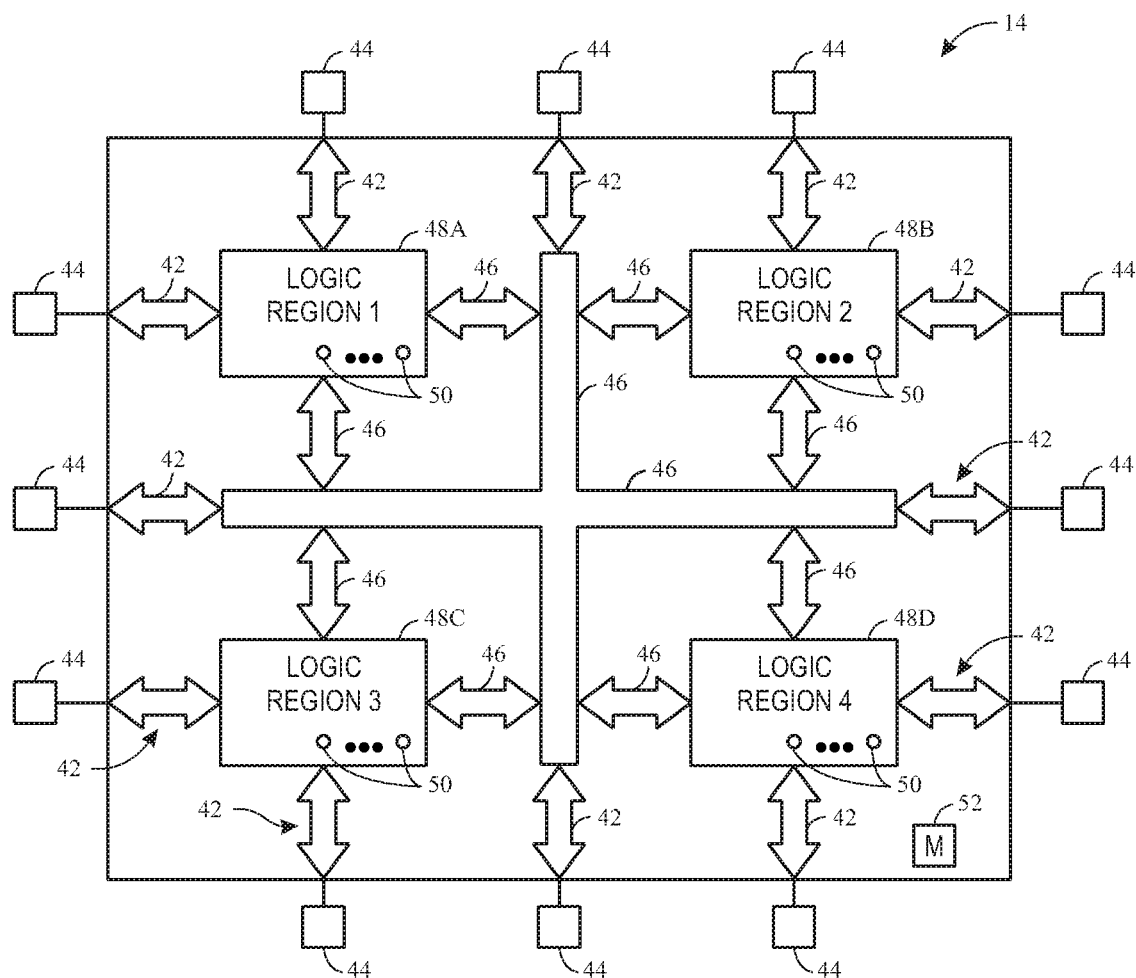
FIG. 2 is a block diagram of a logic element array included in the integrated circuit device of FIG. 1, in accordance with an embodiment.

To help illustrate, one embodiment of a logic element array 14 organized into multiple logic regions 48 is shown in FIG. 2. In particular, the depicted embodiment includes a first logic region 48A, a second logic region 48B, a third logic region 48C, and a fourth logic region 48D, which each includes one or more logic elements 50. In some embodiments, a logic element 50 may include one or more muxes, one or more flip-flops, one or more logic gates, one or more logic blocks, one or more look-up-tables, and/or one or more registers.

In some embodiments, the logic element array 14 may be organized such that different logic regions 48 operate to perform different target functions. Additionally or alternatively, the logic element array 14 may be organized such that multiple logic regions 48 cooperate to perform a target function. Thus, to facilitate proper operation of the integrated circuit device 12, operation of different logic regions 48 may be coordinated (e.g., synchronized) and/or data communication may be provided.

To facilitate data communication, the logic element array 14 may include input/output circuitry 42, input/output pins 44, and an internal communication network 46 (e.g., a network-on-chip). In some embodiments, the input/output circuitry 42 may facilitate external data communication via the input/output pins 44, for example, between the logic element array 14 and another integrated circuit device 12. Additionally, in some embodiments, internal communication network 46 may facilitate internal data communication, for example, between logic regions 48 and/or with input/output circuitry 42. Thus, in some embodiments, the internal communication network 46 may include interconnects, such as conductive lines and/or busses. Furthermore, in some embodiments, the internal communication network 46 may include fixed interconnects and/or programmable interconnects.

Additionally, in some embodiments, the logic elements 50 and, thus, the logic regions 48 operate based at least in part on a received clock signal. In particular, operations may be performed based on rising edges and/or falling edges of the received clock signal. Thus, to facilitate coordinating operation of multiple logic regions 48, approximately the same clock signal may be communicated to corresponding logic elements 50 in the logic regions 48.

Figure 3A:
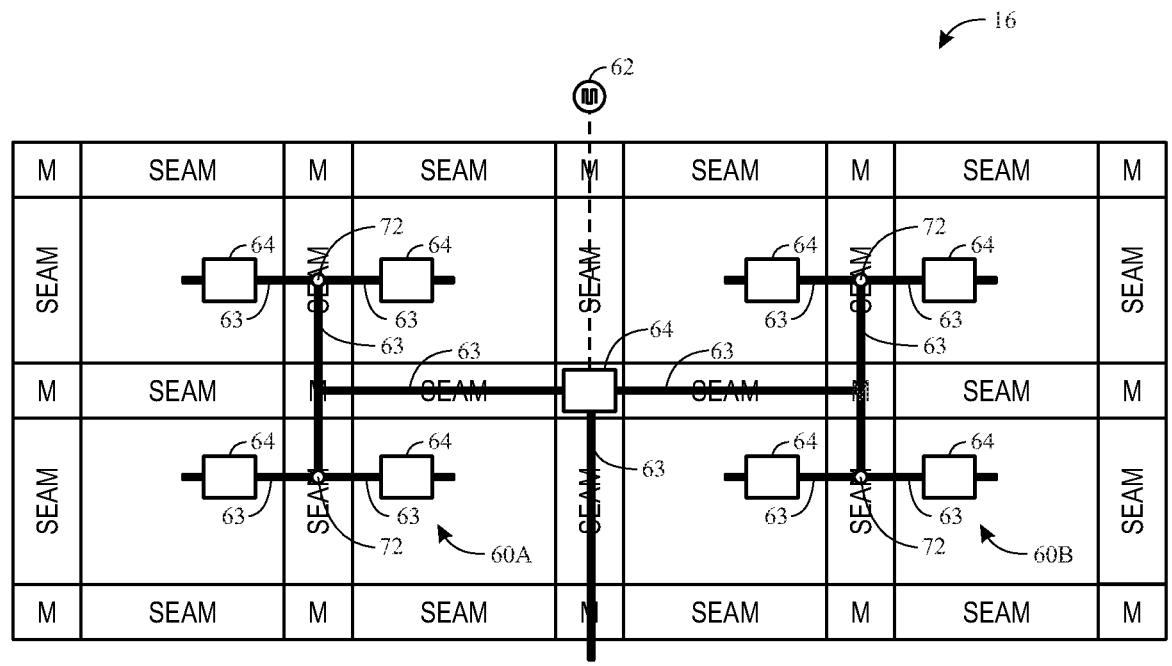
FIGS. 3A and 3B are block diagrams that illustrate implemented clock trees of the integrated circuit device of FIG. 1, in accordance with an embodiment.

Returning to the integrated circuit device 12 of FIG. 1, the clock tree 16 may facilitate communicating a clock signal to the various logic regions 48. To help illustrate, one embodiment of a clock tree 16 is shown in FIG. 3A. In particular, in the depicted embodiment, the clock tree 16 has the topology of an H-tree built on the components of a clock grid. It should be appreciated that the described embodiment of the clock tree 16 is merely intended to be illustrative and not limiting. In other words, in other embodiments, the techniques described in the present disclosure may be implemented in other clock tree configurations.

With regard to the depicted embodiment, the clock tree 16 includes clock interconnects 63, clock switch blocks 64, and tunable delay buffers 72 (e.g., delay devices). In operation, a clock switch block 64 may receive a source clock signal from a clock source 62, for example, directly from the clock source 62 and/or via an upstream clock switch block 64. Additionally, the clock switch block 64 may route the source clock through one or more tunable delay devices 72 via a block interconnect 63 and/or to a target logic region (e.g., 48A, B, C, or D of FIG. 2).

In this manner, the clock tree 16 may route the source clock signal to logic elements 50 and/or logic regions 48 in the logic element array 14. For example, in the depicted embodiment, the clock tree 16 includes a first branch 60A that may be used to route the source clock signal to the first logic region 48A. Additionally, in the depicted embodiment, the clock tree 16 includes a second branch 60B that may be used to route the source clock signal to the fourth logic region 48D.

Additionally, in some embodiments, integrated circuit device 12 may include one or many delay measurement circuits 17 implemented in hard and/or soft logic to enable relative clock measurement between different logic regions 48. That is, the delay measurement circuits 17 may be used to compare the clock signal routed through the first logic region 48A and the clock signal routed through the fourth logic region 48D to determine delays, or skew, between the clock signals of each logic region 48. It should be appreciated that the delay measurement circuits 17 may additionally or alternatively be implemented to compare one or more branches 60 that route the source clock signal to other logic regions 48 (e.g., second logic region 48B and/or third logic region 48C).

As described above, in some instances, routing clock signals through the clock tree 16 may introduce clock skew, for example, due to variations in branch length, stages (e.g., muxes or buffers) along the branches, and/or other electrical factors (e.g., process variation). However, as described above, clock skew may affect operation of the logic elements 50 and, thus, coordination between different logic regions 48 in an integrated circuit device 12. Thus, in some embodiments, operation of one or more tunable delay buffers 72 along a branch 60 may be controlled based at least in part on expected clock skew.

Tunable delay buffers 72 may be constructed in several different ways, as will be discussed below, but their main function, as their name suggests, is to tune, or alter the delay present in a clock signal. In other words, they are utilized in circuits to advance or reduce delays so that clock signals are better aligned. Returning to FIG. 3A, tunable delay buffers 72 are positioned at the end of the clock tree, or at the leaves. As described earlier, the routing of the clock tree and variations of branch length may introduce clock skew to the clock signal. Therefore, utilizing the tunable delay buffers 72 to adjust the clock signal to account for skew at the ends of the clock tree may facilitate more reliable timing in the target logic regions (e.g., 48A, B, C, or D of FIG. 2). However, as the size of the clock tree grows, the skew in the clock signal at the leaves of the tree also increases, requiring the tunable delay buffers 72 to account for greater skew. As a result, it may beneficial to place additional tunable delay buffers at earlier portions, or levels of the tree, especially at the junctures where separate branches split off.

Figure 3B:
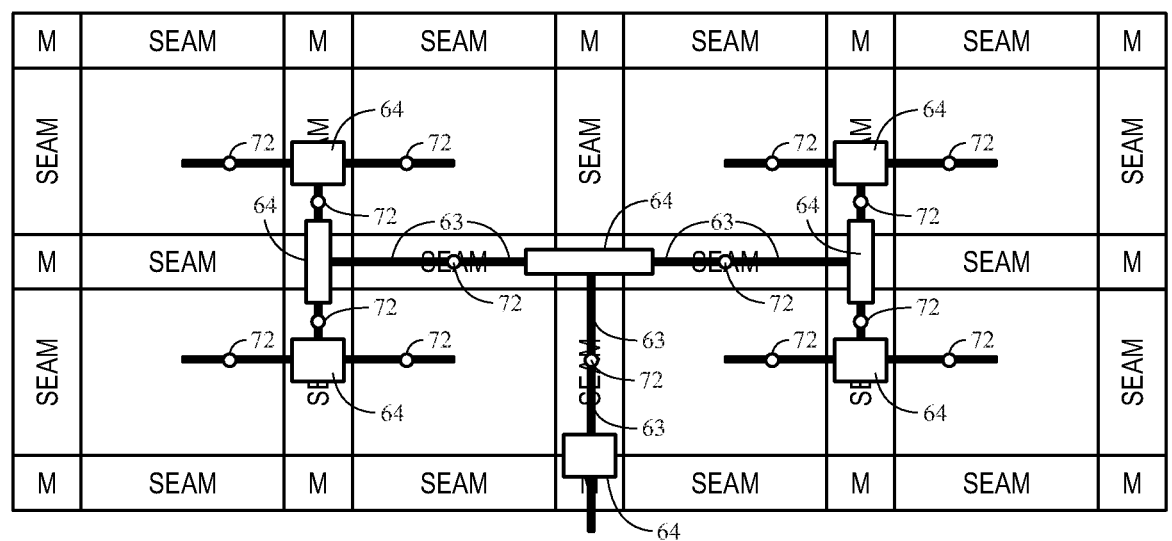

As mentioned above, it may be beneficial to place the tunable delay devices at each juncture of the clock network. In such embodiments, the amount of clock delay adjustment from the clock root to the leaves may be controlled to be proportional to the depth of the clock tree, and actual clock delay uncertainty caused by the tunable delay blocks 72 may be reduced. FIG. 3B illustrates an embodiment of clock network having tunable delay buffers present 72 at each juncture, such that adjustment of the clock through the entire subtree is enabled.

As illustrated in FIG. 3B, in some embodiments, at each juncture, or node, of the clock network, a tunable delay buffer 72 may be present on each side of the juncture to allow for adjustment of the clock signal through the entire subtree. In some embodiments, clock switch blocks 64 may also be present at each node. To help illustrate, another embodiment of a clock tree 16' is shown in FIG. 3B. The illustrated embodiment of FIG. 3B is similar to the embodiment of the clock tree 16 but may also include clock switch blocks 64 at each node of the clock network and/or tunable delay buffers 72 on each branch following a node. In such embodiments, relative clock measurements of delay between a node's branches at each level within the tree may be taken using delay measurement circuits 17. Since the relative clock measurements may be a result of variable clock skews in different portions of the tree, an algebraic system of equations may be used to determine where delays can be adjusted within the clock tree. In other words, the controller 18 may process the clock measurement data using a set of equations representative of the connectivity of the clock network used to distribute the clock that, once solved, may produce a number of delay settings that minimize the skew at various points of the clock distribution network. With these settings, the controller 18, may instruct one or more tunable delay buffers 72 to adjust applied delay, as mentioned above.

Measurement error and some aspects of clock variability may not be captured in an algebraic system. As such, in some embodiments, oversampling of the data, by measuring all the adjacent boundaries between clock regions, along with best-fit analysis may be used as a technique to minimize uncertainty. In these embodiments, the relative error between the measurement and the best-fit analysis model may help to refine the actual uncertainty that may be factored into the place and route solution.

Additionally, the uncertainty may be reduced in embodiments where one or more tunable delay blocks 72 are present at each of the nodes of the clock network because skew may be removed within the tree instead of or in addition to at the end of the tree's branches, or leaves. By removing skew before the leaves, more delay may be present in the common nodes, which may reduce the contribution of the tunable delay buffers 72, themselves, to the clock uncertainty. This hierarchical solution to remove skew may also be more stable than removing skew at the leaves, where there may be many more equivalent solutions.

Figure 4A:
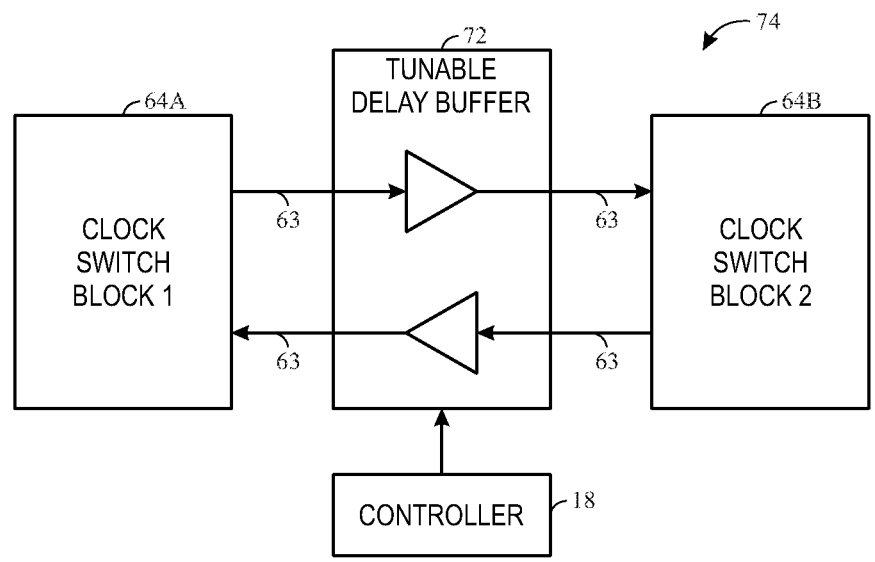
FIGS. 4A and 4B are block diagrams of portions of the clock tree of FIGS. 3A and 3B, in accordance with an embodiment.

Turning now to a discussion of the tunable delay devices, a portion 74 of the clock tree 16 is shown in FIG. 4A. As depicted, the portion 74 includes a first clock switch block 64A communicatively coupled to a second clock switch block 64B via clock interconnects 63 through a tunable delay device 72. Additionally, as depicted, the controller 18 is communicatively coupled to the tunable delay device 72. In this manner, the controller 18 may instruct the tunable delay buffer 72 to adjust delay applied on a corresponding clock interconnect 63 based at least in part on expected clock skew.

Figure 4B:
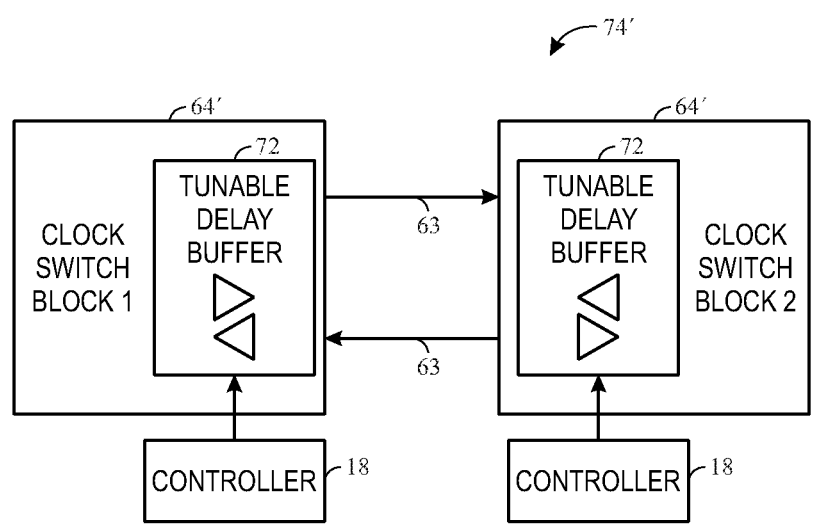

In another embodiment, as illustrated in FIG. 4B, a portion 74' of the clock tree 16 may instead be configured with clock switch blocks 64' that contain one or many tunable delay buffers 72 within the clock switch block components, themselves. The tunable delay buffers 72 may be implemented in various ways. In one embodiment, the tunable delay buffer may be comprised of a string of buffers and/or inverters, which may be combined with a mux to select one of the clock outputs to be the delayed output. In another, one or many bias transistors may be used to change the pull-up and/or pull-down impedance of a digital drive. This embodiment may also include a digitally programmable voltage to drive the gates of the bias transistors. In yet another, one or many loads (i.e. capacitance), which may be under programmable control so that the load(s) may slow down the speed of a string of one or more buffers and/or inverters, may be added into a clock switch block 64' to implement a tunable delay buffer. With these and any other method to build a tunable delay buffer, the tunable delay buffer 72 components may be built within various stage(s) of the clock switch blocks 64'. As mentioned earlier, additionally/alternatively, the tunable delay buffer components 72 may reside in the clock tree 16 separate from the clock switch block components 64.

In some embodiments, the clock tree 16 may be programmed and/or reprogrammed. That is, the routing of a source clock signal from the clock source 62 to the logic regions 48 may be dynamically set. In such embodiments, the clock switch blocks 64 may control clock signal routing in a manner that facilitates implementing a corresponding clock routing configuration (e.g., implementation of branches 60 in the clock tree 16).

Figure 5:
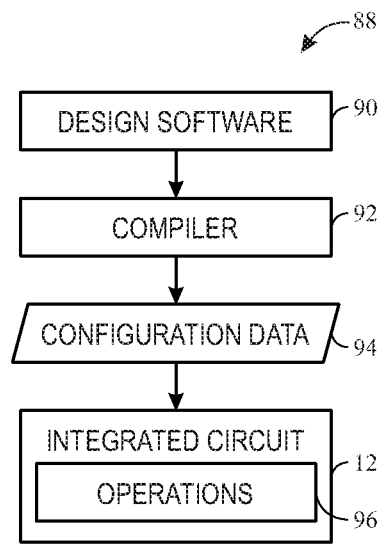
FIG. 5 is a block diagram of a programming system used to program operation of the integrated circuit device of FIG. 1, in accordance with an embodiment.

To help illustrate, one embodiment of a programming system 88 that may be used to program (e.g., configure) operation of an integrated circuit device 12 is shown in FIG. 5. In some embodiments, the programming system 88 may enable programming operation of the integrated circuit device 12 during semiconductor manufacturing, for example, using mask programming arrangements. Additionally, in some embodiments, the programming system 88 may enable one-time programming of the integrated circuit device 12 after manufacture, for example, using fuses and/or antifuses.

Furthermore, in some embodiments, the programming system 88 may enable dynamically programming (e.g., reprogramming) operation of the integrated circuit device 12 when the integrated circuit device 12 is a programmable (e.g., reconfigurable) logic device, such as a field programmable gate array (FPGA). In some embodiments, the integrated circuit device 12 may be programmed using design software 90, such as a version of Quartus by Intel™. Additionally, the design software 90 may use a compiler 92 to generate configuration data 94, such as a low-level circuit-design kernel program, sometimes known as a program object file.

To program the integrated circuit device 12, the configuration data 94 may be stored, for example, in configuration memory 52 shown in FIG. 2. In some embodiments, the configuration memory 52 may be implemented as random-access-memory (RAM) cells. Since these RAM cells are loaded with configuration data during programming, they are sometimes referred to as configuration RAM cells (CRAM). Based at least in part on the configuration data, control signals may be generated to control operation 96 of the integrated circuit device 12.

For example, based at least in part on target function configuration data, a control signal may be applied to the gate of a metal-oxide-semiconductor (e.g., logic element 50) to control operation in a manner that facilitates implementing a corresponding target function. In some embodiments, based at least in part on data routing configuration data, a control signal may be supplied to the internal communication network 46 to control data routing in a manner that facilitate implementing a corresponding target data routing configuration. Additionally or alternatively, based at least in part on clock routing configuration data, a control signal may be supplied to the clock switch blocks 64 to control clock signal routing in a manner that facilitates implementing a corresponding clock routing configuration (e.g., implementation of branches 60 in the clock tree 16).

In some instances, programming (e.g., reprogramming) an integrated circuit device 12 to adjust operation and/or configuration of the clock tree 16 may affect electrical factors. For example, reprogramming a branch 60 from a first routing configuration to a second routing configuration may affect branch length and/or stages (e.g., muxes or buffers) along the branch 60. Thus, in such instances, programming (e.g., reprogramming) the integrated circuit device 12 may further increase likelihood and/or magnitude of clock skew introduced by a clock tree 16.

To facilitate reducing likelihood of clock skew affecting operation of the integrated circuit device 12, the delay measurement circuits 17 may determine skew (e.g., phase-shift or time-shift) data. As described above, in some embodiments, clock skew expected to be introduced by one branch 60 may be determined with reference to clock skew introduced by another branch 60 in the clock tree 16. In other words, in such embodiments, a reference clock signal may be received from a different branch 60 compared to a clock signal adjusted for skew, or a second clock signal. For example, with regard to FIG. 3A, the delay measurement circuit 17 may receive a first clock signal from the first branch 60A and a second clock signal from the second branch 60B. Thus, to determine clock skew on the second branch 60B, the delay measurement circuit 17 may use the first clock signal as a reference clock signal. In other embodiments, the reference clock signal may be predetermined, for example, by time shifting and/or phase shifting the source clock signal.

The delay measurement circuit 17 may determine the skew data based at least in part whether a rising edge on the reference clock signal leads or lags a corresponding (e.g., closest in time) rising edge on the second clock signal and duration between the rising edge on the reference clock signal and the corresponding rising edge on the second clock signal. Additionally or alternatively, the delay measurement circuit 17 may determine the skew data based at least in part whether a falling edge on the reference clock signal leads or lags a corresponding (e.g., closest in time) falling edge on the second clock signal and duration between the falling edge on the reference clock signal and the corresponding falling edge on the second clock signal.

Based at least in part on the skew data, the controller 18 may instruct one or more tunable delay buffers 72 to adjust applied delay. In some embodiments, the controller 18 may receive the skew data from the delay measurement circuit 17 and communicate control signals (e.g., commands) to a tunable delay buffer 72 indicating amount of delay that should be applied to subsequently communicated source clock signals. In this manner, operation of the tunable delay buffers 72 may be controlled to reduce likelihood and/or magnitude of variation in clock skew introduced by different branches 60, which may improve operation of the integrated circuit device 12, for example, by facilitating coordinated operation of multiple logic regions 48 with improved operational efficiency and/or reduced operational latency.

Figure 6:
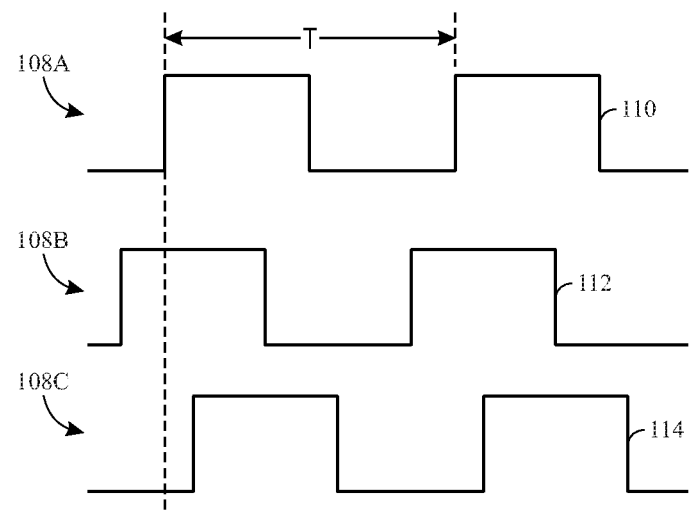
FIG. 6 illustrates timing diagrams of a reference clock signal and a second clock signals, in accordance with an embodiment.

To help illustrate the skew adjustment process, timing diagrams 108 describing clock signals are provided in FIG. 6. In particular, a first timing diagram 108A includes a first waveform 110 representative of a clock signal. Additionally, a second timing diagram 108B includes a second waveform 112 representative of a second clock signal, and a third timing diagram 108C includes a third waveform 114 representative of a third clock signal.

Based on the rising edges and/or falling edges of first waveform 110 and the second waveform 112, the delay measurement circuit 17 may determine skew data that indicates that the second waveform 112 lags behind the first waveform 110 by approximately one-eighth of the clock cycle (T). As such, based at least in part on the skew data, the controller 18 may instruct one or more tunable delay buffers 74 on a corresponding branch 60 to decrease delay applied to subsequently communicated source clock signals such that the resulting first signal 108B is expected to be delayed an additional seven-eighths of the clock cycle (T). Additionally or alternatively, the controller 18 may instruct one or more tunable delay buffers 74 on the corresponding branch 60 to reduce delay applied to subsequently communicated source clock signals such that the resulting signal 108B is expected to be advanced one-eighth of the clock cycle (T).

Additionally, based on the rising edges and/or falling edges of first waveform 110 and the third waveform 114, the delay measurement circuit 17 may determine skew data that indicates that the third waveform 114 leads the first waveform 110 by approximately one-eighth of the clock cycle (T). As such, based at least in part on the skew data, the controller 18 may instruct one or more tunable delay buffers 74 on a corresponding branch 60 to increase delay applied to subsequently communicated source clock signals such that the resulting third waveform 114 is expected to be delayed an additional one-eighth of the clock cycle (T). Additionally or alternatively, the controller 18 may instruct one or more tunable delay buffers 74 on the corresponding branch 60 to reduce delay applied to subsequently communicated source clock signals such that the resulting the third waveform 114 is expected to be advanced seven-eighths of the clock cycle (T).

Figure 7:
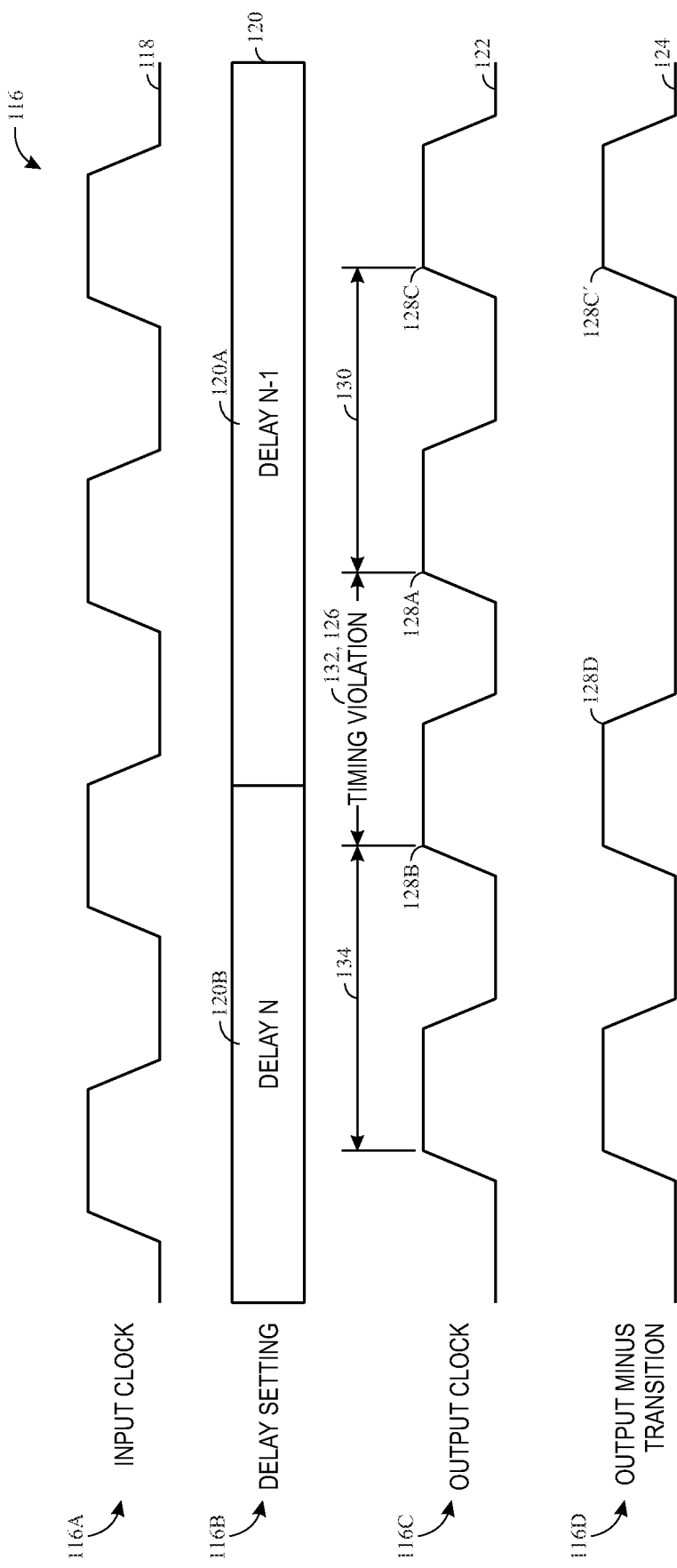
FIG. 7 illustrates timing diagrams of a reference clock signal, an adjustable delay setting, an output clock signal with a timing violation, and an output clock signal minus the transition caused by delay setting changes, in accordance with an embodiment.

Because a tunable delay buffer may shorten and/or lengthen clock delay, it may impact the current clock cycle that it changes. A change to the clock delay may cause a timing violation on paths contained within the clock domain driven by that tunable delay buffer. FIG. 7 demonstrates a timing violation using the timing diagram 116. In particular, a first timing diagram 116A includes a first waveform 118 representative of a reference, or input clock signal. A second timing diagram 116B includes an adjustable delay setting 120 introduced to the input clock signal's first waveform 118 by an element such as a tunable delay buffer 72. A third timing diagram 116C demonstrates the impact of the delay setting 116B on the first waveform 118 and the resulting timing violation 126 through an output clock waveform 122. In the third timing diagram 116C, a timing violation 126 occurs between the second and third falling edges, 128A and 128B, respectively, on the output clock waveform 122, where the delay setting changed from the length of Delay N−1 120A to the length of Delay N 120B. Because the length of the delay shortened, the falling edges 128A and 128B of the second clock cycle 132 and third clock cycle 134 are too close to one another, resulting in a timing violation 126 that may impact the behavior of the logic region 48 that receives this clock signal. The fourth timing diagram 116D, may illustrate a more desirable result in a waveform where the transition of the delay lengths from Delay N−1 120A to Delay N 120B is ignored so that the output clock minus transition waveform 124 has a prolonged period of time between the first falling edge 128C' of the first cycle 130 and the next rising edge 128D, thereby skipping the timing violation. By skipping the transition using a tunable delay buffer 72, unexpected behavior due to timing violations may not occur in a logic region 48. Therefore, in some embodiments, a tunable delay buffer may need the capability of skipping a transition, whether it is the rising and/or falling edge of a clock cycle, to allow for a prolonged and/or shortened period between edges of the impacted cycle in order to avoid a timing violation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

Embodiments of the Current Application The following numbered clauses define embodiments of the current application.

Clause A1. An integrated circuit device, comprising:
a first logic region comprising a first plurality of logic gates that operate based at least in part on a first clock signal to facilitate providing a target function;
a clock tree comprising:
a first clock switch block that receives a source clock signal from a clock source;
a first branch communicatively coupled between the first clock switch block and the first logic region, wherein:
the first branch operates to provide the first clock signal to the first logic region based at least in part on the source clock signal; and
a set of one or more tunable delay buffers disposed at each juncture of the clock tree that operate to apply a delay to clock signals based at least in part on a clock skew expected to be introduced by subtrees of the juncture, the set of one or more tunable delay buffers comprising a first tunable delay buffer that operates to apply a first delay to the first clock signal based at least in part on a first clock skew expected to be introduced by the first branch.

Clause A2. The integrated circuit device of clause A1, comprising a second logic region comprising a second plurality of logic gates that operate based at least in part on a second clock signal to facilitate providing the target function in cooperation with the first logic region;
wherein the clock tree comprises a second branch communicatively coupled between the first clock switch block and the second logic region, wherein the second branch operates to provide the second clock signal to the second logic region based at least in part on the source clock signal.

Clause A3. The integrated circuit device of any of the preceding clauses, comprising a delay measurement circuit configured to determine skew between two or more clock signals.

Clause A4. The integrated circuit device of clause A3, wherein the two or more clock signals comprise the first clock signal and the source clock signal.

Clause A5. The integrated circuit device of any of clause A1, A2, or A3, comprising a controller configured to instruct the first tunable delay buffer to apply the first delay based in part on the first clock skew and a set of equations representative of a connectivity of the clock tree.

Clause A6. The integrated circuit device of clause A5, wherein the controller is configured to instruct the first tunable delay buffer to apply the first delay and a second tunable delay buffer of the set of one or more tunable delay buffers to apply a second delay based at least in part on an additive delay comprising a sum of the first delay and the second delay, wherein the second tunable delay buffer is disposed at a juncture in a subtree of the first branch, and wherein the additive delay is based at least in part on a clock skew expected to be introduced by a leaf of the subtree of the first branch.

Clause A7. The integrated circuit device of any of clause A1, A2, A3, or A5, wherein the first delay adjusts a period of a clock cycle of the first clock signal to avoid a timing violation.

Clause A8. The integrated circuit device of any of clause A1, A2, A3, A5, or A7, wherein the first branch comprises:
a first clock interconnect that communicatively couples the first clock switch block to the first tunable delay buffer; and
a second clock interconnect that communicatively couples the first tunable delay buffer to a second clock switch block.

Clause A9. The integrated circuit device of any of clause A1, A2, A3, A5, A7, or A8 wherein:
the first logic region comprises a mux, a flip-flop, a logic block, a look-up-table, a register, or any combination thereof; and
the target function comprises a combinational function, a sequential function, an arithmetic function, a logic function, a custom function, or any combination thereof.

Clause A10. The integrated circuit device of any of clause A1, A2, A3, A5, A7, A8, or A9 wherein the integrated circuit device comprises a field-programmable gate array.

Clause A11. An integrated circuit device, comprising:
a clock tree, comprising one or more junctures;
a set of one or more clock switch blocks that receive a source clock signal from a clock source, disposed at each of the one or more junctures, the set of one or more clock switch blocks comprising:
circuitry that selectively routes the source clock signal between:
a first branch in a clock tree to enable a first logic region of the integrated circuit device communicatively coupled to the first branch to operate based at least in part on the source clock signal; and
a second branch in the clock tree to enable a second logic region of the integrated circuit device communicatively coupled to the second branch to operate based at least in part on the source clock signal; and
a tunable delay buffer that operates to apply a first delay to a first clock signal based at least in part on a first clock skew expected to be introduced by the first branch.

Clause A12. The integrated circuit device of clause A11, comprising a delay measurement circuit configured to determine skew data between the first clock signal and the source clock signal.

Clause A13. The integrated circuit device of clause A12, wherein the skew data indicates: whether the first clock signal leads the source clock signal, whether the first clock signal lags the source clock signal, a first duration the first clock signal leads the source clock signal, a second duration the first clock signal lags the source clock signal, or any combination thereof.

Clause A14. The integrated circuit device of any of clause A11 or A12, wherein the tunable delay buffer comprises a plurality of bias transistors configured to change a pull-up impedance, a pull-down impedance, or a combination, thereof, of a digital drive.

Clause A15. The integrated circuit device of any of clause A11, A12, or A14, wherein the tunable delay buffer comprises a string of one or more buffers.

Clause A16. The integrated circuit device of clause A15, wherein a plurality of loads are configured to slow down the speed of the string of one or more buffers.

Clause A17. A machine-implemented method, comprising:
  determining, at each juncture of a clock network of an integrated circuit, skew data indicative of difference between a first delay introduced on a source clock signal resulting from routing the source clock signal to a first portion of an integrated circuit device via a clock tree; and
  instructing one or more tunable delay buffers to adjust delay applied to the source clock signal by the clock tree based at least in part on the skew data to facilitate coordinating operation of the first portion of the integrated circuit device.

Clause A18. The machine-implemented method of clause A17, wherein the integrated circuit comprises a plurality of logic regions each comprising a plurality of logic gates that operate based at least in part on the source clock signal to facilitate providing a target function.

Clause A19. The machine-implemented method of clause A18, comprising oversampling the skew data, wherein oversampling the skew data comprises determining, for each pair of logic regions in the plurality of logic regions, the skew data at an adjacent boundary between the pair of logic regions, along with best-fit analysis.

Clause A20. The machine-implemented method of any of clause A17 or A18, comprising storing configuration data in configuration memory of the integrated circuit device, wherein the configuration data:
  adjusts first operations performed by the first portion of the integrated circuit device;
  adjusts second operations performed by a second portion of the integrated circuit device;
  routes the source clock signal through the clock tree to the first portion of the integrated circuit device;
  routes the source clock signal through the clock tree to a second portion of the integrated circuit device; or
any combination thereof.

Clause B1. An integrated circuit device, comprising:
  a first logic region comprising a first plurality of logic gates that operate based at least in part on a first clock signal to facilitate providing a target function;
  a clock tree comprising:
    a first clock switch block that receives a source clock signal from a clock source;
    a first branch communicatively coupled between the first clock switch block and the first logic region, wherein:
      the first branch operates to provide the first clock signal to the first logic region based at least in part on the source clock signal; and
    a set of one or more tunable delay buffers disposed at each juncture of the clock tree that operate to apply a delay to clock signals based at least in part on a clock skew expected to be introduced by subtrees of the juncture, the set of one or more tunable delay buffers comprising a first tunable delay buffer that operates to apply a first delay to the first clock signal based at least in part on a first clock skew expected to be introduced by the first branch.

Clause B2. The integrated circuit device of clause B1, comprising a second logic region comprising a second plurality of logic gates that operate based at least in part on a second clock signal to facilitate providing the target function in cooperation with the first logic region; wherein the clock tree comprises a second branch communicatively coupled between the first clock switch block and the second logic region, wherein the second branch operates to provide the second clock signal to the second logic region based at least in part on the source clock signal.

Clause B3. The integrated circuit device of any of clauses B1 or B2, comprising a delay measurement circuit configured to determine skew between two or more clock signals.

Clause B4. The integrated circuit device of clause B3, wherein the two or more clock signals comprise the first clock signal and the source clock signal.

Clause B5. The integrated circuit device of any of clause B1, B2, or B3, comprising a controller configured to instruct the first tunable delay buffer to apply the first delay based in part on the first clock skew and a set of equations representative of a connectivity of the clock tree.

Clause B6. The integrated circuit device of clause B5, wherein the controller is configured to instruct the first tunable delay buffer to apply the first delay and a second tunable delay buffer of the set of one or more tunable delay buffers to apply a second delay based at least in part on an additive delay comprising a sum of the first delay and the second delay, wherein the second tunable delay buffer is disposed at a juncture in a subtree of the first branch, and wherein the additive delay is based at least in part on a clock skew expected to be introduced by a leaf of the subtree of the first branch.

Clause B7. The integrated circuit device of any of clause B1, B2, B3, or B5, wherein the first delay adjusts a period of a clock cycle of the first clock signal to avoid a timing violation.

Clause B8. The integrated circuit device of any of clause B1, B2, B3, B5, or B7, wherein the first branch comprises:
  a first clock interconnect that communicatively couples the first clock switch block to the first tunable delay buffer; and
  a second clock interconnect that communicatively couples the first tunable delay buffer to a second clock switch block.

Clause B9. The integrated circuit device of any of clause B1, B2, B3, B5, B7, or B8 wherein:
  the first logic region comprises a mux, a flip-flop, a logic block, a look-up-table, a register, or any combination thereof; and
  the target function comprises a combinational function, a sequential function, an arithmetic function, a logic function, a custom function, or any combination thereof.

Clause B10. The integrated circuit device of any of clause B1, B2, B3, B5, B7, B8, or B9 wherein the integrated circuit device comprises a field-programmable gate array.

Clause B11. An integrated circuit device, comprising:
  a clock tree, comprising one or more junctures;
  a set of one or more clock switch blocks that receive a source clock signal from a clock source, disposed at each of the one or more junctures, the set of one or more clock switch blocks comprising:
    circuitry that selectively routes the source clock signal between:
      a first branch in a clock tree to enable a first logic region of the integrated circuit device communicatively coupled to the first branch to operate based at least in part on the source clock signal; and
      a second branch in the clock tree to enable a second logic region of the integrated circuit device communicatively coupled to the second branch to operate based at least in part on the source clock signal; and a tunable delay buffer that operates to apply a first delay to a first clock signal based at least in part on a first clock skew expected to be introduced by the first branch.

Clause B12. The integrated circuit device of clause B11, comprising a delay measurement circuit configured to determine skew data between the first clock signal and the source clock signal.

Clause B13. The integrated circuit device of clause B12, wherein the skew data indicates: whether the first clock signal leads the source clock signal, whether the first clock signal lags the source clock signal, a first duration the first clock signal leads the source clock signal, a second duration the first clock signal lags the source clock signal, or any combination thereof.

Clause B14. The integrated circuit device of any of clause B11 or B12, wherein the tunable delay buffer comprises a plurality of bias transistors configured to change a pull-up impedance, a pull-down impedance, or a combination, thereof, of a digital drive.

Clause B15. The integrated circuit device of any of clause B11, B12, or B14, wherein the tunable delay buffer comprises a string of one or more buffers.

Clause B16. The integrated circuit device of clause B15, wherein a plurality of loads are configured to slow down the speed of the string of one or more buffers.

Clause B17. A machine-implemented method, comprising:
determining, at each juncture of a clock network of an integrated circuit, skew data indicative of difference between a first delay introduced on a source clock signal resulting from routing the source clock signal to a first portion of an integrated circuit device via a clock tree; and
instructing one or more tunable delay buffers to adjust delay applied to the source clock signal by the clock tree based at least in part on the skew data to facilitate coordinating operation of the first portion of the integrated circuit device.

Clause B18. The machine-implemented method of clause B17, wherein the integrated circuit comprises a plurality of logic regions each comprising a plurality of logic gates that operate based at least in part on the source clock signal to facilitate providing a target function.

Clause B19. The machine-implemented method of clause B18, comprising oversampling the skew data, wherein oversampling the skew data comprises determining, for each pair of logic regions in the plurality of logic regions, the skew data at an adjacent boundary between the pair of logic regions, along with best-fit analysis.

Clause B20. The machine-implemented method of any of clause B17 or B18, comprising storing configuration data in configuration memory of the integrated circuit device, wherein the configuration data:
adjusts first operations performed by the first portion of the integrated circuit device;
adjusts second operations performed by a second portion of the integrated circuit device;
routes the source clock signal through the clock tree to the first portion of the integrated circuit device;
routes the source clock signal through the clock tree to a second portion of the integrated circuit device; or
any combination thereof.

Clause B21. A tangible, non-transitory, machine-readable medium, comprising machine-readable instructions that, when executed by one or more processors, cause the processors to perform the machine-implemented method of any of clause B17, B18, or B20.

Clause C1. An integrated circuit device, comprising:
a first logic region comprising a first plurality of logic gates that operate based at least in part on a first clock signal to facilitate providing a target function;
a clock tree comprising:
a first clock switch block that receives a source clock signal from a clock source;
a first branch communicatively coupled between the first clock switch block and the first logic region, wherein:
the first branch operates to provide the first clock signal to the first logic region based at least in part on the source clock signal; and
a set of one or more tunable delay buffers disposed at each juncture of the clock tree that operate to apply a delay to clock signals based at least in part on a clock skew expected to be introduced by subtrees of the juncture, the set of one or more tunable delay buffers comprising a first tunable delay buffer that operates to apply a first delay to the first clock signal based at least in part on a first clock skew expected to be introduced by the first branch.

Clause C2. The integrated circuit device of clause C1, comprising a second logic region comprising a second plurality of logic gates that operate based at least in part on a second clock signal to facilitate providing the target function in cooperation with the first logic region;
wherein the clock tree comprises a second branch communicatively coupled between the first clock switch block and the second logic region, wherein the second branch operates to provide the second clock signal to the second logic region based at least in part on the source clock signal.

Clause C3. The integrated circuit device of any of clause C1 or C2, comprising a delay measurement circuit configured to determine skew between two or more clock signals.

Clause C4. The integrated circuit device of any of clause C1, C2, or C3, comprising a controller configured to instruct the first tunable delay buffer to apply the first delay based in part on the first clock skew and a set of equations representative of a connectivity of the clock tree.

Clause C5. The integrated circuit device of clause C4, wherein the controller is configured to instruct the first tunable delay buffer to apply the first delay and a second tunable delay buffer of the set of one or more tunable delay buffers to apply a second delay based at least in part on an additive delay comprising a sum of the first delay and the second delay, wherein the second tunable delay buffer is disposed at a juncture in a subtree of the first branch, and wherein the additive delay is based at least in part on a clock skew expected to be introduced by a leaf of the subtree of the first branch.

Clause C6. The integrated circuit device of any of clause C1, C2, C3, or C4, wherein the first delay adjusts a period of a clock cycle of the first clock signal to avoid a timing violation.

Clause C7. The integrated circuit device of any of clause C1, C2, C3, C4, or C6, wherein the first branch comprises:
a first clock interconnect that communicatively couples the first clock switch block to the first tunable delay buffer; and
a second clock interconnect that communicatively couples the first tunable delay buffer to a second clock switch block.

Clause C8. The integrated circuit device of any of clause C1, C2, C3, C4, C6, or C7 wherein:
- the first logic region comprises a mux, a flip-flop, a logic block, a look-up-table, a register, or any combination thereof; and
- the target function comprises a combinational function, a sequential function, an arithmetic function, a logic function, a custom function, or any combination thereof.

Clause C9. The integrated circuit device of any of clause C1, C2, C3, C4, C6, C7, or C8 wherein the integrated circuit device comprises a field-programmable gate array.

Clause C10. A tangible, non-transitory, machine-readable medium, comprising machine-readable instructions that, when executed by one or more processors, cause the processors to:
- instruct a set of one or more clock switch blocks that receive a source clock signal from a clock source, disposed at each of one or more junctures of a clock tree, to selectively route, the source clock signal between:
  - a first branch in the clock tree to enable a first logic region of an integrated circuit device communicatively coupled to the first branch to operate based at least in part on the source clock signal; and
  - a second branch in the clock tree to enable a second logic region of the integrated circuit device communicatively coupled to the second branch to operate based at least in part on the source clock signal; and
- instruct a tunable delay buffer to apply a first delay to a first clock signal based at least in part on a first clock skew expected to be introduced by the first branch.

Clause C11. The machine-readable medium of clause C10, comprising instructions to instruct a delay measurement circuit to determine skew data between the first clock signal and the source clock signal, wherein the skew data indicates: whether the first clock signal leads the source clock signal, whether the first clock signal lags the source clock signal, a first duration the first clock signal leads the source clock signal, a second duration the first clock signal lags the source clock signal, or any combination thereof.

Clause C12. The machine-readable medium of clause C10 or C11, wherein the tunable delay buffer comprises a plurality of bias transistors configured to change a pull-up impedance, a pull-down impedance, or a combination thereof, of a digital drive, a string of one or more buffers, or a combination thereof.

Clause C13. A machine-implemented method, comprising:
- determining, at each juncture of a clock network of an integrated circuit, skew data indicative of difference between a first delay introduced on a source clock signal resulting from routing the source clock signal to a first portion of an integrated circuit device via a clock tree; and
- instructing one or more tunable delay buffers to adjust delay applied to the source clock signal by the clock tree based at least in part on the skew data to facilitate coordinating operation of the first portion of the integrated circuit device.

Clause C14. The machine-implemented method of clause C13, comprising oversampling the skew data, wherein oversampling the skew data comprises determining, for each pair of logic regions in a plurality of logic regions, the skew data at an adjacent boundary between the pair of logic regions, along with best-fit analysis, wherein the integrated circuit comprises the plurality of logic regions each comprising a plurality of logic gates that operate based at least in part on the source clock signal to facilitate providing a target function Clause C15. The machine-implemented method of any of clause C13 or C14, comprising storing configuration data in configuration memory of the integrated circuit device, wherein the configuration data:
- adjusts first operations performed by the first portion of the integrated circuit device;
- adjusts second operations performed by a second portion of the integrated circuit device;
- routes the source clock signal through the clock tree to the first portion of the integrated circuit device;
- routes the source clock signal through the clock tree to a second portion of the integrated circuit device; or
- any combination thereof.

What is claimed is:

1. An integrated circuit device, comprising:
   a first logic region comprising a first plurality of logic gates that operate based at least in part on a first clock signal to facilitate providing a target function;
   a clock tree comprising:
   a first clock switch block that receives a source clock signal from a clock source;
   a first branch communicatively coupled between the first clock switch block and the first logic region, wherein:
   the first branch operates to provide the first clock signal to the first logic region based at least in part on the source clock signal; and
   a set of one or more tunable delay buffers disposed at each juncture of the clock tree that operate to apply a delay to clock signals based at least in part on a clock skew expected to be introduced by subtrees of that juncture, the set of one or more tunable delay buffers comprising a first tunable delay buffer that operates to apply a first delay to the first clock signal based at least in part on a first clock skew expected to be introduced by the first branch.

2. The integrated circuit device of claim 1, comprising a second logic region comprising a second plurality of logic gates that operate based at least in part on a second clock signal to facilitate providing the target function in cooperation with the first logic region;
   wherein the clock tree comprises a second branch communicatively coupled between the first clock switch block and the second logic region, wherein the second branch operates to provide the second clock signal to the second logic region based at least in part on the source clock signal.

3. The integrated circuit device of claim 1, comprising a delay measurement circuit configured to determine skew between two or more clock signals.

4. The integrated circuit device of claim 3, wherein the two or more clock signals comprise the first clock signal and the source clock signal.

5. The integrated circuit device of claim 1, comprising a controller configured to instruct the first tunable delay buffer to apply the first delay based in part on the first clock skew and a set of equations representative of a connectivity of the clock tree.

6. The integrated circuit device of claim 5, wherein the controller is configured to instruct the first tunable delay buffer to apply the first delay and a second tunable delay buffer of the set of one or more tunable delay buffers to apply a second delay based at least in part on an additive delay comprising a sum of the first delay and the second delay, wherein the second tunable delay buffer is disposed at a juncture in a subtree of the first branch, and wherein the additive delay is based at least in part on a clock skew expected to be introduced by a leaf of the subtree of the first branch.

7. The integrated circuit device of claim 1, wherein the first delay adjusts a period of a clock cycle of the first clock signal to avoid a timing violation.

8. The integrated circuit device of claim 1, wherein the first branch comprises:
  a first clock interconnect that communicatively couples the first clock switch block to the first tunable delay buffer; and
  a second clock interconnect that communicatively couples the first tunable delay buffer to a second clock switch block.

9. The integrated circuit device of claim 1, wherein:
  the first logic region comprises a mux, a flip-flop, a logic block, a look-up-table, a register, or any combination thereof; and
  the target function comprises a combinational function, a sequential function, an arithmetic function, a logic function, a custom function, or any combination thereof.

10. The integrated circuit device of claim 1, wherein the integrated circuit device comprises a field-programmable gate array.

\* \* \* \* \*